United States Patent Office 2,894,805
Patented July 14, 1959

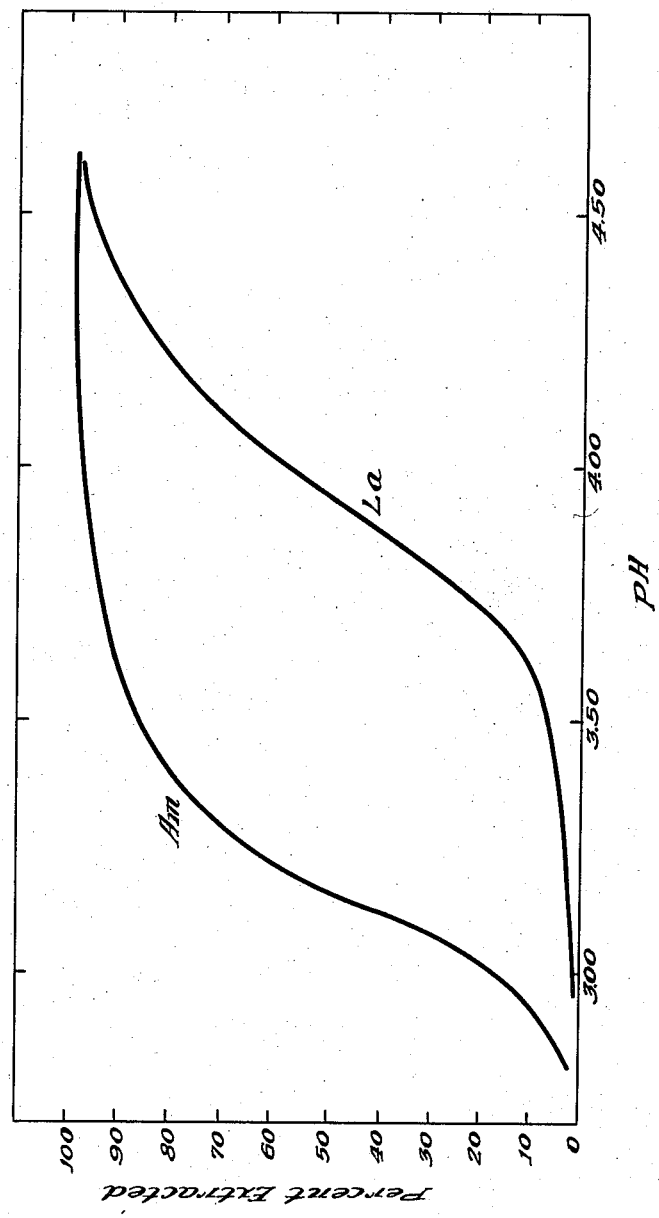
INVENTORS:
Louis B. Werner
Isadore Perlman
Melvin Calvin
By: Roland A. Anderson
Attorney

2,894,805

SEPARATION PROCESS FOR ACTINIDE ELEMENTS AND COMPOUNDS THEREOF

Louis B. Werner, Isadore Perlman, and Melvin Calvin, Berkeley, Calif., assignors to the United States of America as represented by the United States Atomic Energy Commission Application December 6, 1949, Serial No. 131,266

11 Claims. (Cl. 23—14.5)

This invention relates to compounds of actinide elements having an atomic number of at least 95, namely, americium and curium, and to a process for the separation of these elements of the actinide series from aqueous solutions. The present invention more especially relates to the separation of these actinide elements from lanthanum, thorium, and iron.

The present invention also relates to the extraction of these actinide elements from an organic solvent solution of chelate compounds of the elements in the trivalent state.

$Pu^{239}$ is produced in a neutronic reactor by bombardment of $U^{238}$ according to the following equation:

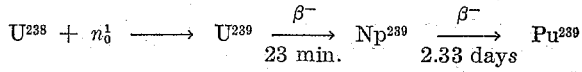

Part of the $Pu^{239}$ is converted by a higher order neutron capture reaction to form appreciable amounts of $Pu^{241}$ which decays by $\beta$ emission with a half-life of about 10 years to $Am^{241}$. This isotope of element 95, i.e., americium, is an $\alpha$-emitter with a half-life of 500 years. By various processes, which are not part of the present invention, it has been found possible to recover the small amounts of americium produced substantially or even completely free of plutonium, uranium, and fission products of $U^{235}$. In one of these americium recovery processes lanthanum fluoride is used as a carrier precipitate. Since lanthanum is trivalent and americium is normally trivalent in aqueous solutions, the problem arose of separating these trivalent elements to recover americium of a high order of purity.

The curium isotope $Cm^{242}$ can be produced by cyclotron bombardment of $Pu^{239}$ with helium ions. It may also be prepared by irradiation of $Am^{241}$ in a neutronic reactor in accordance with the following equation:

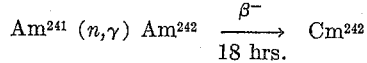

$Cm^{242}$ is an $\alpha$-emitter having a half-life of 150 days. When curium is prepared from plutonium as described above, curium is separated from plutonium in one process, as a mixture with lanthanum, usually as a lanthanum fluoride precipitate by which the trivalent curium is carried from an aqueous solution. The lanthanum fluoride precipitate by metathesis with an alkali metal hydroxide is converted to lanthanum hydroxide. It is dissolved in an acid thereby producing an aqeous solution containing a lanthanum salt and curium salt.

When americium and curium are separated from plutonium, uranium, etc., by means of a lanthanum fluoride carrier precipitate, the aqueous solution of lanthanum salt and americium or curium salt finally obtained has a ratio of lanthanum to the trivalent actinide element which is considerably greater than 1; in some cases the ratio is as high as 2000 or 5000. Since commercial lanthanum salts contain some thorium, the mixture of lanthanum and the trivalent actinide element will also contain thorium, unless lanthanum salt used has been purified before use. During the separation process from uranium, plutonium, etc. the trivalent actinide element becomes contaminated with ferric iron due to slight corrosion of the vessels.

It is an object of the present invention to provide new compounds of the actinide elements having an atomic number of at least 95.

A second object of this invention is to separate the actinide element from an aqueous solution of a salt of the element in the trivalent state.

A third object of the present invention is to provide a process for separating the actinide element from aqueous solutions containing salts of the trivalent actinide element and lanthanum.

Another object of this invention is to separate a mixture of the actinide element and thorium present in an aqueous solution containing salts thereof.

A further object of the present invention is to provide a process for separating the actinide element from an organic solvent solution of a chelate compound of the actinide element in the trivalent state, and especially from such solution obtained in the extraction of the actinide element as a chelate compound from an aqueous solution.

Other objects of the present invention will be apparent from the description which follows:

We have found that a suitable separation of an actinide element having an atomic number of at least 95, namely, americium and curium, from an acidic aqueous solution of a trivalent salt thereof can be obtained by contacting the aqueous solution with a certain type of chelating agent alone or as an organic solvent solution to form a chelate compound of the trivalent actinide element. When the organic solvent is present the chelate compound of the trivalent actinide element is extracted; otherwise, it is separated by filtration or other suitable means.

The chelating agent of the present invention is a fluorinated $\beta$-diketone having the general formula:

$$R-\underset{\underset{O}{\|}}{C}-CH_2-\underset{\underset{O}{\|}}{C}-\underset{\underset{F}{|}}{C}-R^2$$

wherein R is a member of the group consisting of alkyl, aryl, aralkyl, alkaryl, and heterocyclic radicals and $R^1$ and $R^2$ are members of the group consisting of hydrogen and fluorine. Of course, the R group may contain various substituents such as halogen groups and nitro groups. It is preferred that $R^1$ and $R^2$ are both fluorine atoms and examples of such a class of compounds are:

Trifluoroacetylacetone

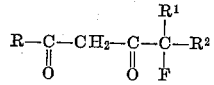

Propionyltrifluoroacetone

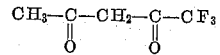

Isovaleryltrifluoroacetone

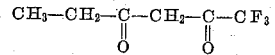

Heptanoyltrifluoroacetone

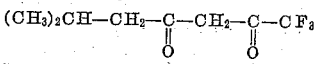

Benzoyltrifluoroacetone

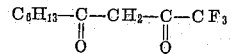

2-thenoyltrifluoroacetone

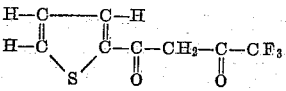

p-Fluorobenzoyltrifluoroacetone $$F-\text{C}_6\text{H}_4-\underset{\underset{O}{\|}}{C}-CH_2-\underset{\underset{O}{\|}}{C}-CF_3$$

p-Phenylbenzoyltrifluoroacetone $$C_6H_5-C_6H_4-\underset{\underset{O}{\|}}{C}-CH_2-\underset{\underset{O}{\|}}{C}-CF_3$$

β-Naphthoyltrifluoroacetone $$C_{10}H_7-\underset{\underset{O}{\|}}{C}-CH_2-\underset{\underset{O}{\|}}{C}-CF_3$$

2-furoyltrifluoroacetone $$\begin{array}{c}H-C\!=\!=\!=\!C-H\\ \|\quad\quad\|\\ H-C\quad\;\;C-\underset{\underset{O}{\|}}{C}-CH_2-\underset{\underset{O}{\|}}{C}-CF_3\\ \diagdown O\diagup\end{array}$$

Phenylacetyltrifluoroacetone $$C_6H_5-CH_2-\underset{\underset{O}{\|}}{C}-CH_2-\underset{\underset{O}{\|}}{C}-CF_3$$

3-phenylpropionyltrifluoroacetone $$C_6H_5-CH_2-CH_2-\underset{\underset{O}{\|}}{C}-CH_2-\underset{\underset{O}{\|}}{C}-CF_3$$

p-Methylbenzoyltrifluoroacetone $$CH_3-C_6H_4-\underset{\underset{O}{\|}}{C}-CH_2-\underset{\underset{O}{\|}}{C}-CF_3$$

p-Ethylbenzoyltrifluoroacetone $$C_2H_5-C_6H_4-\underset{\underset{O}{\|}}{C}-CH_2-\underset{\underset{O}{\|}}{C}-CF_3$$

Examples of suitable fluorinated β-diketones containing less than three fluorine atoms are:

Fluoroacetylacetone $$CH_3-\underset{\underset{O}{\|}}{C}-CH_2-\underset{\underset{O}{\|}}{C}-CH_2F$$

Difluoroacetylacetone $$CH_3-\underset{\underset{O}{\|}}{C}-CH_2-\underset{\underset{O}{\|}}{C}-CHF_2$$

The efficiency of chelation-extraction is not the same for all. 2-thenoyltrifluoroacetone, benzoyltrifluoroacetone, and trifluoroacetylacetone are preferred fluorinated β-diketones to be used in the process of the present invention.

The organic solvent for the present invention is a substantially water-immiscible organic compound which is liquid at the temperature of carrying out the process. Examples of suitable types of organic solvents are aromatic hydrocarbons, chlorinated aromatic hydrocarbons, chlorinated paraffinic hydrocarbons and aliphatic ketones. Specific examples are benzene, toluene, chlorobenzene, hexafluoroxylene, chloroform, carbon tetrachloride, trichloroethylene and methyl isobutyl ketone (also known as hexone). Benzene, toluene, hexafluoroxylene and hexone are the preferred solvents.

The acidity of the aqueous solution is obtained by the presence of a strong inorganic acid in a concentration to provide a minimum pH value of about 2, preferably a minimum pH value of 3.

When the process of the present invention is used to separate the actinide element in the trivalent state from lanthanum the acidic aqueous solution has a pH between 2 and 4.8. The pH of the solution within this range for this separation of the actinide element and lanthanum is dependent upon the degree of separation desired, and upon the amount or concentration of the fluorinated β-diketone used. It is preferred that the pH be between 2.5 and 4. It was found that the degree of chelation-extraction varies directly with the third power of the fluorinated β-diketone concentration and inversely with the third power of the hydrogen ion concentration, as indicated by the following equation using americium for illustration and the symbol HKe for the fluorinated β-diketone $$Am^{+3}+3HKe \rightarrow AmKe_3+3H^+$$

Accordingly, the lower value of the preferred pH, namely, a pH of 2.5, is utilized for separating the actinide element from lanthanum when the concentration of the fluorinated β-diketone in the organic solvent is about 2 M. Similarly, the concentration of the fluorinated β-diketone is about 0.02 M when the pH of the aqueous solution is about 4.5. As will be seen from the examples presented below the pH is about 3.5 when the concentration of the fluorinated β-diketone in the organic solvent is 0.2 M. Examples of strong inorganic acids that are present in the aqueous solution to provide the acidity of the aqueous solution from which the actinide element in the trivalent state is to be separated are as follows: nitric acid, hydrochloric acid, perchloric acid, and sulfuric acid. Nitric acid and hydrochloric acid are the preferred acids.

The temperature at which the process is carried out may be varied considerably; for example, temperatures of 10 to 60° C. are satisfactory. The preferred temperature is room temperature.

The time of contact between the aqueous solution and the chelating agent or the aqueous solution of the chelating agent of this invention is dependent upon the temperature, the organic solvent, the specific chelating agent and numerous other factors including the efficiency of contacting the materials. While a wide range of contact time is suitable a time of at least ten minutes is preferred.

When the chelating agent, namely, the fluorinated β-diketone having the formula described above, is used with an organic solvent, the concentration of the chelating agent may be varied widely. The concentration of fluorinated β-diketone will depend upon the degree of extraction desired, upon the concentration of the salt of the trivalent actinide element in the initial aqueous solution, upon the pH of the acidic aqueous solution, and upon whether or not the actinide element is to be separated from lanthanum. The concentrations to be used when the aqueous solutions have certain pH values have been presented above. It is preferred that the concentration of the fluorinated β-diketone be at least 0.02 M, and it is especially preferred that it be at least 0.1 M.

The ratio of the organic solvent solution to aqueous solution may be varied considerably, but the preferred range of ratio is between 10:1 and 1:10.

Examples of suitable water-soluble salts of these actinide elements in the trivalent state that may be used in the aqueous solutions previously defined are as follows: chlorides, nitrates, and perchlorates. The concentrations of these salts may be as low as tracer concentrations, such as concentrations of the order of $10^{-8}$ and $10^{-10}$ M.

The new compounds of the actinide elements of this invention are compounds of these actinide elements in the trivalent state and the fluorinated β-diketones. They are represented by the following general formulas in which americium is used for illustration:

$$\left[\begin{array}{c}R\\|\\C=O\\\|\\C-H\\\|\\C-O\\|\\R^1-C-F\\|\\R^2\end{array}\right]_3\!\!Am \quad \left[\begin{array}{c}R\\|\\C-O\\\|\\C-H\\\|\\C=O\\|\\R^1-C-F\\|\\R^2\end{array}\right]_3\!\!Am$$

wherein R, $R^1$, $R^2$ represent the same groups as indicated above for the general formula of the chelating agent. It is seen that there are two possible formulas for the americium (and curium) chelate compounds, since the β-diketone may enolize in either of two ways. In either case, americium is bonded to the oxygen atoms by a covalent bond and a coordinate bond and due to resonance the two compounds would be identical. These compounds are solids which have a negligible solubility in water, and which are soluble in benzene, toluene and other organic solvents. These compounds are colored and may be used to form decorative coatings or to form coatings where films of α-emitters are desired.

In one embodiment of this invention the chelate compound of the actinide element having an atomic number of at least 95 is prepared by contracting an aqueous solution containing a salt of the actinide element in the trivalent state with a fluorinated β-diketone of the type described above or with an organic solvent solution of the fluorinated β-diketone. In the following description of this embodiment and in the other embodiments to be described, trivalent americium is used for illustration; of course, trivalent curium is also suitable in these embodiments. In this embodiment the amount of fluorinated β-diketone used is preferably less than the stoichiometric amount for the formation of the trivalent americium chelate compound so that the latter when formed will not be contaminated with excess fluorinated β-diketone, when precipitated from the aqueous solution, or when extracted from the aqueous solution where organic solvent is used. The aqueous solution used in this embodiment contains the strong inorganic acid and has a minimum pH of 2, preferably 3, as described above. Other conditions such as the ratio of organic solvent solution and aqueous solution are those mentioned above. When the fluorinated β-diketone is used alone the precipitated chelate compound is separated by settling, centrifugation, filtration, or other suitable means. When an organic solvent solution of fluorinated β-diketone is used the resultant aqueous phase and organic solvent extract phase are separated, e.g., by settling or centrifugation, and the organic solvent extract phase contains an americium chelate compound of the fluorinated β-diketone.

In the second embodiment of the present invention americium is separated from an aqueous solution containing the trivalent americium salt by contacting the aqueous solution as described in the first embodiment. The amount of fluorinated β-diketone is preferably much greater than the stoichiometric amount for the formation of trivalent americium chelate compound. In this embodiment the conditions described above for acidity of the aqueous solution, temperatures, etc. are used.

The americium is separated from the organic solvent solution of americium chelate compound by contacting the solution with an aqueous solution having a pH of less than 2 and preferably containing at least 0.1 N strong inorganic acid, and separating the resultant organic solvent phase and aqueous extract phase containing an americium salt. It is especially preferred that the acidic aqueous solution for extracting the americium from the organic solvent solution of americium chelate compound contain at least 1 N strong inorganic acid, such as nitric acid, perchloric acid, and hydrochloric acid.

The americium can also be separated from the organic solvent solution of trivalent americium compound by diluting the organic solvent solution with an additional quantity of organic solvent to provide a maximum concentration of free and combined fluorinated β-diketone of less than 0.01 M, then contacting the resultant diluted solution with an aqueous solution having a pH of less than 4, and separating the organic solvent and aqueous extract phases. It is preferred that the aqueous solution contain at least 0.1 N strong inorganic acid.

In a third embodiment of this invention americium is separated from its aqueous solution by contacting the aqueous solution of the type described above with a chelating agent of this invention in the absence of an organic solvent and at a temperature above the melting point of the β-diketone. The amount of the fluorinated β-diketone chosen is a considerable excess so that excess β-diketone acts as a solvent for the americium chelate compound.

In a fourth embodiment of this invention americium is separated from an aqueous solution containing water-soluble salts of trivalent americium and lanthanum. The aqueous solution, of course, contains the pH range described above for separation of americium from lanthanum. Other conditions are those of the second embodiment.

Another embodiment comprises separating americium from an organic solvent solution of an americium chelate compound of a fluorinated β-diketone of the formula presented above. The process of this embodiment is described in the second embodiment in conjunction therewith as a complete extraction and re-extraction process.

The following examples taken alone and in combination illustrate the embodiments of this invention.

EXAMPLE I

The radioactive isotope $La^{140}$ was separated from $Ba^{140}$ parent by precipitation of lanthanum hydroxide in the presence of natural barium hold-back carrier by using carbonate-free ammonium hydroxide. The precipitate was washed, dissolved in acid, and the lanthanum was re-precipitated to further separate $La^{140}$ from $Ba^{140}$. In this purification about 1 mg. of natural lanthanum ($La^{139}$) was used to carry the radioactive lanthanum. The lanthanum hydroxide obtained by the second precipitation was dissolved in inorganic acid and the resultant solution was diluted to 10 ml. To the same vessel an equal volume of 0.2 M 2-thenoyltrifluoroacetone in benzene was added. The pH of the aqueous solution was adjusted by the addition of 0.5 N sodium hydroxide solution. Samples of both aqueous and benzene phases were taken after a 10-minute vigorous stirring period. Further adjustments of pH, stirring, and sampling were made. The lanthanum extractions were determined by the β activity of aliquots of both phases. The data of extraction from aqueous solutions having various pH values were determined.

A study of the extraction of americium using 0.2 M 2-thenoyltrifluoroacetone in benzene and at various pH values for the aqueous solution was carried out in a manner similar to that described above for lanthanum extraction. The α activities of aliquots of benzene and aqueous phases were determined by counting in an α-chamber. The data, along with the lanthanum extraction data, are presented in the form of extraction curves of a graph in the accompanying drawing which forms a part of this specification.

A comparison of these curves shows, that using 0.2 M fluorinated β-diketone of this invention and using an aqueous solution having a pH greater than 3 and less than 4.5 a separation of americium from at least part of lanthanum can be obtained, and that at a pH of $3.5 \pm 0.3$, i.e., at a pH of 3.2 to 3.8, the best separations are effected. Of course, by increasing or lowering the concentration of the fluorinated β-diketone the pH range for effectuating the separation is lowered or raised accordingly, as described earlier in the specification.

EXAMPLE II

Thirteen ml. of an aqueous solution having a pH of 3.23 and containing lanthanum nitrate and americium nitrate with a La/Am ratio of about 2500 was contacted with 10 ml. of 0.2 M 2-thenoyltrifluoroacetone for ten minutes. After separation and removal of the benzene phase, the aqueous solution was rinsed three times with 1 ml. solutions of 0.2 M 2-thenoyltrifluoroacetone in benzene. The benzene rinses and benzene extract were combined. Aliquots of the combined benzene solution and of the resultant aqueous phase were used for determination of α activity as in Example I. The resultant aqueous solution was treated with a 10-ml. quantity of benzene containing 0.2 M fluorinated β-diketone, followed by three 1-ml. rinses as described above. The α activities of the aqueous solution and combined benzene solution were determined. The resultant aqueous solution was treated again in a similar manner. All of the benzene extracts were combined. They contained 98% of the initial americium content. The combined benzene solution, which had a volume of 40 ml., was contacted for an hour with 1 ml. of 0.5 N nitric acid. Aliquots of the benzene phase and the nitric acid extract phase were analyzed for α activity. Only 2.5% of the α activity in the combined benzene extract remained. In other words, 97.5% of the americium was extracted by the 0.5 N nitric acid, which then contained 95.5% of the americium content of the initial aqueous solution. The foregoing experiment constitutes the first cycle of the separation of americium from lanthanum that was carried out as shown below in Table I. After re-extraction of americium the pH of the acid solution was adjusted before the next cycle.

earlier in the specification. The data for re-extraction in cycles numbered 2, 3 and 4 show that a higher (97.5% v. 99% and above) recovery of americium in the re-extraction is obtained using a higher concentration of inorganic acid. The acid solution of americium salt obtained by re-extraction in cycle No. 4 was evaporated to dryness. The residue was dissolved in water and americium hydroxide was precipitated by the addition of ammonium hydroxide. The precipitate was slightly brown in color due to the presence of a trace amount of ferric hydroxide. The precipitate was dissolved in 0.1 N nitric acid and the acidic solution was contacted with an equal volume (100 μl.) of 0.2 M 2-thenoyltrifluoroacetone in benzene. The resultant aqueous phase was treated to precipitate americium hydroxide which was only slightly tan in color. The precipitate was redissolved in 0.1 N nitric acid and treated as before with 0.2 M 2-thenoyltrifluoroacetone in benzene. Ammonium hydroxide was added to the aqueous phase to precipitate americium hydroxide which was pink in color. The foregoing treatments of the aqueous solution containing 0.1 N nitric

*Table I*

SEPARATION OF AMERICIUM FROM LANTHANUM

| Cycle No. | Contact No. | Benzene soln., ml. | Aq. soln., ml. | pH of aq. soln. | α Activity in benzene, percent | α Activity in aq. phase, percent | Am extracted in cycle, percent | Am in aq. phase in cycle, percent | Am in acidic aq. phase, percent |
|---|---|---|---|---|---|---|---|---|---|
| 1 | 1 | 10 | 13 | 3.23 | [1] 74 | [1] 26 | | | |
| | 2 | 10 | 13 | 3.28 | 72 | 28 | | | |
| | 3 | 10 | 13 | 3.31 | 74 | 26 | 98 | 2 | |
| | Re-extraction | 40 | 1 | 0.5 N HNO$_3$ | 2.5 | 97.5 | | | 95.5 |
| 2 | 1 | 5 | 8.3 | 3.27 | 75 | 25 | | | |
| | 2 | 5 | 8.3 | 3.27 | 69 | 31 | | | |
| | 3 | 5 | 8.3 | 3.32 | | | 97.5 | 2.5 | |
| | Re-extraction | 27 | 0.5 | 1 N HNO$_3$ | 1 | 99 | | | 92.2 |
| Thorium removal | 1 | 5 | 8.5 | 2.52 | 0.7 | 99.3 | | | |
| | 2 | 5 | 8.5 | 2.52 | | | 2 | 98 | 90.4 |
| | 3 | 5 | 8.5 | 2.52 | | | | | |
| 3 | 1 | 2.5 | 8.75 | 3.31 | 89 | 11 | | | |
| | 2 | 2.5 | 8.75 | 3.27 | 76 | 24 | | | |
| | 3 | 2.5 | 8.75 | 3.27 | | | 99 | 1 | |
| | Re-extraction | 16.5 | 0.5 | 1 N HNO$_3$ | 0.5 | 99.5 | | | 89 |
| 4 | 1 | 2.5 | 7.5 | 3.27 | | | | | |
| | 2 | 2.5 | 7.5 | 3.25 | | | | | |
| | 3 | 2.5 | 7.5 | 3.39 | | | 99.5 | 0.5 | |
| | Re-extraction | 16.5 | 0.25 | 1 N HNO$_3$ | 0.6 | 99.4 | | | 88 |

[1] These figures in each case represent the percent distributed between aqueous and benzene phases based upon the amount present during the particular extraction.

From Table I it is seen that between cycle No. 2 and cycle No. 3 the thorium impurity, initially introduced by the use of commercial lanthanum for the recovery of americium from plutonium, was removed by chelation-extraction using a pH of 2.52. The three extractions for thorium removal were carried out after adjusting the pH to 2.52. In each case the resultant benzene extract phase was contacted with 3 N nitric acid. The resultant nitric acid extract phase from the first benzene solution contained thorium, since an insoluble iodate was precipitated by the addition of 3 N nitric acid solution of potassium iodate. The second benzene extract phase did not contain sufficient thorium to be precipitated from the nitric acid solution when KIO$_3$ was added. The third nitric acid extract phase was not tested. By the use of higher concentrations of fluorinated β-diketone, thorium can be chelated-extracted from aqueous solutions having a pH as low as 0.2. Similarly when using considerably less than 0.2 M fluorinated β-diketone, thorium is chelated-extracted from aqueous solutions having pH values as high as 3 without substantial chelation-extraction of americium.

At the pH of 2.52 when using 0.2 M 2-thenoyltrifluoroacetone, it is seen that substantially none of the americium was chelated-extracted. Of course, when using a higher concentration of fluorinated β-diketone in the organic solvent, a lower pH is used for thorium removal without americium chelation-extraction. Furthermore, at a higher fluorinated β-diketone concentration and at a pH of 2.52 americium would be chelated-extracted, as mentioned acid with 0.2 M fluorinated β-diketone show that ferric salts can be removed by treating aqueous solutions of trivalent americium salts without chelation-extraction of americium. By adjustment of the pH when using other concentrations of fluorinated β-diketone, it is similarly possible to remove ferric salts from aqueous solutions of americium salts.

One-half of the americium product, i.e. 10 μg., was analyzed spectographically and was found to contain only 0.5% lanthanum as compared with the initial La/Am ration of about 2500.

EXAMPLE III

A mixture of 50 mg. of lanthanum and 10.5 mg. of americium as hydroxides was dissolved in a minimum volume of concentrated hydrochloric acid and the resultant solution was diluted to 10 ml. The pH of the solution was adjusted to 3.5 by the addition of an aqueous solution of alkali metal hydroxide. The resultant solution was contacted with 10 ml. of 0.2 M 2-thenoyltrifluoroacetone in benzene. The aqueous phase contained 42 mg. of lanthanum and only 0.5 mg. of americium. It was retained for recycling to increase the recovery of americium. The benzene extract phase was shaken with 2 ml. of 6 N hydrochloric acid. The resultant benzene phase was discarded and the 6 N hydrochloric extract phase containing 8 mg. of lanthanum and 10 mg. of americium was treated with a minimum volume of 20% KOH to precipitate lanthanum and americium as hydroxides. The precipitate was dissolved in a minimum volume of 12 N hydrochloric acid and diluted to 2 ml. The solution was adjusted to a pH of 3.5 and then shaken with 2 ml. of 0.2 M 2-thenoyltrifluoroacetone in benzene. The resultant aqueous phase containing 0.2 mg. of americium and 6.8 mg. of lanthanum was retained for recycling. The benzene extract phase contained 9.5 mg. of trivalent americium and only 1.2 mg. of lanthanum as chelate compounds of the fluorinated β-diketone. It was shaken with 1 ml. of 6 N hydrochloric acid and the resultant benzene phase was discarded. The hydrochloric acid solution extracted all of the americium and lanthanum from the benzene solution. The americium and lanthanum were precipitated as hydroxides by the addition of a minimum volume of 20% KOH. The precipitate was dissolved in a minimum volume of hydrochloric acid, diluted to 2 ml., the pH adjusted to 3.5, and the solution then extracted with 2 ml. of 0.2 M 2-thenoyltrifluoroacetone in benzene. The resultant aqueous phase containing 1 mg. of lanthanum and about 0.5 mg. of americium was retained for recycling, while the benzene extract phase was shaken with 1 ml. of 6 N hydrochloric acid. The resultant benzene phase was discarded and the final aqueous solution was 1 ml. of 6 N hydrochloric acid containing 9 mg. of americium and only 0.2 mg. of lanthanum. This example shows the high degree of separation of americium from lanthanum by carrying out several stages of cycles of the process of the present invention.

The foregoing examples illustrate the process of the present invention for both americium and curium, which were found to be equivalent in this process.

The process of the present invention may be carried out using batch or continuous conditions with equipment commonly used for cocurrent or countercurrent operation in the continuous process.

The foregoing illustrations and embodiments of this invention are not intended to limit its scope, which is to be limited entirely by the appended claims.

What is claimed is:

1. A process for the separation of an actinide element having an atomic number of at least 95 from its mixture with lanthanum, which comprises contacting an acidic aqueous solution containing a lanthanum salt, a salt of the actinide element in the trivalent state and a strong inorganic acid to provide a pH for the solution of 2 to 4.8 with a solution in a substantially water-immiscible organic solvent of a fluorinated β-diketone having the general formula:

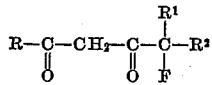

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase and organic solvent extract phase containing a compound of the fluorinated β-diketone and the trivalent actinide element.

2. The process of claim 1 in which the fluorinated β-diketone is benzoyltrifluoroacetone and the organic solvent is benzene.

3. The process of claim 1 in which the fluorinated β-diketone is 2-thenoyltrifluoroacetone and the organic solvent is xylene.

4. The process of claim 1 in which the fluorinated β-diketone is 2-thenoyltrifluoroacetone and the organic solvent is hexafluoroxylene.

5. The process of claim 1 in which the pH of the aqueous solution is between 2.5 and 4, the fluorinated β-diketone is 2-thenoyltrifluoroacetone, and the organic solvent is benzene.

6. The process of claim 1 in which the pH of the aqueous solution is between 2.5 and 4, the fluorinated β-diketone is trifluoroacetylacetone, and the organic solvent is benzene.

7. A process for the separation of a mixture of thorium, lanthanum and an actinide element having an atomic number of at least 95, which comprises dissolving said mixture in an aqueous solution of a strong inorganic acid to provide a solution having a pH between 0.2 and 3 and salts of the actinide element in the trivalent state, thorium and lanthanum, contacting said solution with a solution in substantially water-immiscible organic solvent of a fluorinated β-diketone having the general formula:

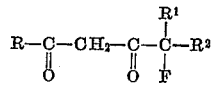

wherein R is a member of the group consisting of alkyl, aryl, aralkyl, alkaryl and heterocyclic radicals and $R^1$ and $R^2$ are members of the group consisting of hydrogen and fluorine, separating the resultant aqueous phase containing a major portion of the salt of actinide element and lanhtanum salt, and an organic solvent extract phase containing a thorium chelate compound of the fluorinated β-diketone, adjusting the pH of the aqueous solution to a value between 2 and 4.8, contacting the aqueous solution with a substantially water-immiscible organic solvent solution of a fluorinated β-diketone having said general formula, and separating an aqueous phase and an organic solvent extract phase containing a chelate compound of the fluorinated β-diketone and the trivalent actinide element.

8. A process for the separation of a mixture of thorium and an actinide element having an atomic number of at least 95, which comprises dissolving said mixture in an aqueous solution of a strong inorganic acid to provide a solution having a pH between 0.2 and 3 and salts of the actinide element in the trivalent state and thorium, contacting said solution with a solution in a substantially water-immiscible organic solvent of a fluorinated β-diketone having the general formula:

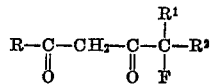

wherein R is a member of the group consisting of alkyl, aryl, aralkyl, alkaryl and heterocyclic radicals and $R^1$ and $R^2$ are members of the group consisting of hydrogen and fluorine, and separating the resultant aqueous phase containing a major portion of the salt of actinide element and an organic solvent extract phase containing a thorium chelate compound of the fluorinated β-diketone.

9. The process of claim 8 in which the fluorinated β-diketone is 2-thenoyltrifluoroacetone and the organic solvent is benzene.

10. The process of claim 8 in which the fluorinated β-diketone is trifluoroacetylacetone and the organic solvent is benzene.

11. The process of claim 8 in which the fluorinated β-diketone is benzoyltrifluoroacetone and the organic solvent is benezene.

References Cited in the file of this patent

UNITED STATES PATENTS

| | | |
|---|---|---|
| 2,156,918 | Lyons | May 2, 1939 |
| 2,223,932 | Towne | Dec. 3, 1940 |
| 2,227,833 | Hixson et al. | Jan. 7, 1941 |

OTHER REFERENCES

Harvey et al.: "The Chemistry of Plutonium," Journal of the Chem. Soc., pages 1013, 1014, 1020, 1021 (August 1947).

Seaborg: "Plutonium and Other Transuranium Elements," Chem. and Eng. News, vol. 25, pages 358–360 (1947).